April 28, 1970
A. BOUDOURIS
3,508,819
APPARATUS FOR PROJECTING FILM AND THE LIKE
Filed Aug. 2, 1967
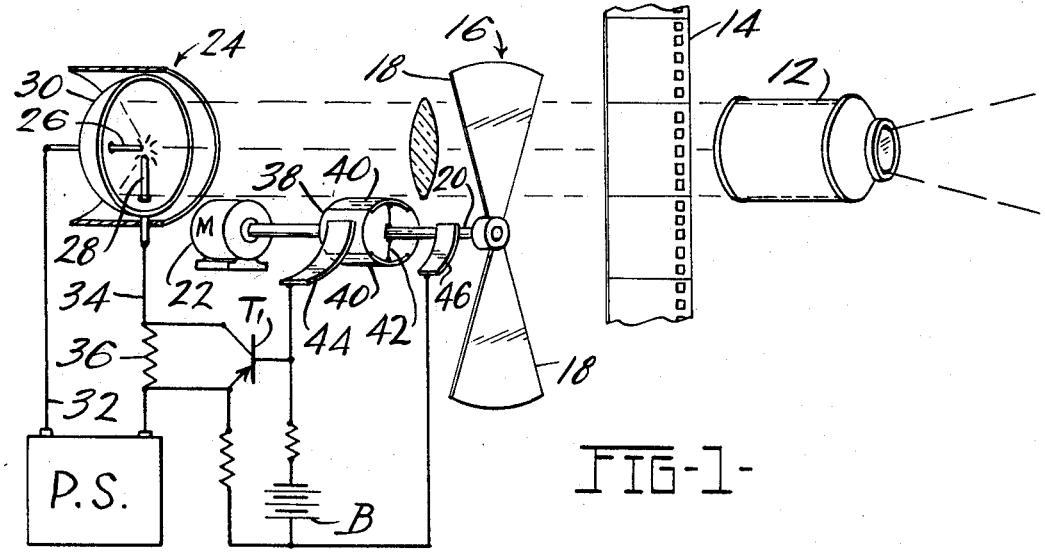
FIG-1-
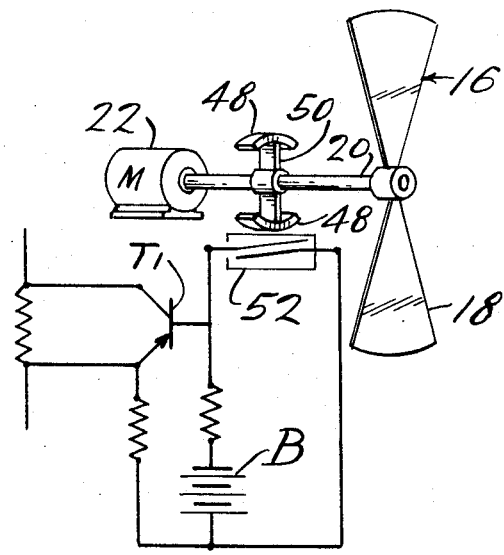
FIG-2-
INVENTOR:
ANGELO BOUDOURIS.
BY
ATT'YS.

United States Patent Office 3,508,819
Patented Apr. 28, 1970

1

3,508,819
APPARATUS FOR PROJECTING FILM AND
THE LIKE
Angelo Boudouris, Sylvania, Ohio, assignor to Eprad
Incorporated, Toledo, Ohio, a corporation of Ohio
Filed Aug. 2, 1967, Ser. No. 657,916
Int. Cl. G03b 21/00
U.S. Cl. 352—199     5 Claims

ABSTRACT OF THE DISCLOSURE

A light source for a movie projector is pulsed in a manner to be off when the shutter is closed and on when the shutter is open. The light pulse is controlled by an electronically responsive switch which selectively connects an impedance into and out of the circuit in response to the position of the shutter. A commutator arrangement or a magnetically responsive reed switch is used to coordinate the electronically responsive switch and the shutter position. The light thus is on about one-half the time, only during the time in which it is needed to project an image from the film. This provides a longer lamp life or enables a brighter light to be produced by supplying higher power to the lamp for a shorter period of time. Power consumption also is substantially reduced.

---

This invention relates to a method and apparatus for projecting an image from film onto a surface and particularly to a method and apparatus for pulsing a movie projector lamp so as to be on only when the shutter is open.

By pulsing a projection lamp so as to be on only when light is needed, the life of the lamp can be extended, being made possible at least in part because it can operate at a lower temperature. Alternately, higher power can be supplied to the lamp to produce a brighter light and still enable the lamp to operate at a moderate temperature, similar to that encountered when the normal power is continuously supplied to the lamp.

The invention can be particularly advantageously applied to xenon lamps which often are incapable of supplying as bright a light as a carbon arc lamp. By pulsing the power to the xenon lamp, higher power can be applied and a brighter light can be obtained without heating the lamp excessively or otherwise causing damage. Hence, a pulsed xenon lamp can provide light equivalent to that obtained from a carbon arc lamp. The xenon lamp has a particular advantage over a carbon arc lamp in that little supervision is required, whereas a carbon arc lamp requires almost constant attention. Hence, carbon arc lamps cannot be practically used in automated projection booths which are becoming more and more popular, constituting a significant factor in making movie theaters more efficient.

Basically, the invention includes an electrically-responsive switch located in circuit with the lamp power source, which switch is turned on and off or rendered conducting and non-conducting in synchronization with the movement of the shutter to supply full power to the lamp when the shutter is open or out of the path of the light and to supply substantially lower power when the shutter is closed or in the path of the light.

It is, therefore, a principal object of the invention to modulate or pulse the projection lamp of a movie projector to achieve the advantages outlined above.

Many other objects and advantages of the invention will be apparent from the following detailed description of preferred embodiments thereof, reference being made to the accompanying drawing, in which:

2

FIG. 1 is a diagrammatic view of film projecting apparatus embodying the invention; and
FIG. 2 is a diagrammatic view similar to FIG. 1 showing slightly modified apparatus according to the invention.

Referring to FIG. 1, the basic components of a movie projector are shown schematically. These include a lens 12, behind which a film 14 is lineally moved in increments by suitable means (not shown). A shutter 16 is located behind the film and, in the specific form shown, includes two shutter blades 18 which are rotated at a speed such that light passes through each of the frames of the film 14 twice as the frame is momentarily held stationary behind the lens 12. This eliminates possible flicker and means that forty-eight "pulses" of light occur on the screen each second, in most instances. As shown, the blades 18 are mounted on a shutter shaft 20 and driven by suitable drive means such as a motor 22. The shutter 16 is located between the lens 12 and a light source 24 which can be a carbon arc lamp or a xenon lamp, by way of example, being specifically shown as a carbon arc lamp.

The lamp 24 has a pair of electrodes 26 and 28 between which persists an arc which is reflected and directed through the appropriate frame of the film 14 and the lens 12 by a reflector 30. Power is supplied to the lamp 24 from a source of power designated PS by conductors 32 and 34. The conductor 34 contains an impedance and specifically a resistor 36 which substantially reduces the power supplied to the lamp 24 and can reduce the power to substantially zero if the resistor is of a sufficiently high value.

An electrically-responsive switch means and specifically a transistor T1 is connected in circuit between the power source and the lamp and, in this specific instance, is in parallel with the resistor 36. When the transistor T1 is in a state of high conductivity, it substantially shunts the resistor 36 so that predetermined full power is supplied from the power source PS to the lamp 24. When the transistor T1 is in a state of low conductivity, most of the current must pass through the resistor 36 so that substantially lower power is supplied to the lamp 24. By co-ordinating the position of the shutter 16 and the condition of the switch means or transistor T1, the lamp 24 can be pulsed so that it is on when the shutter 16 is open or the blades 18 are out of the path of the light from the lamp 24 through the lens 12. Similarly, the lamp 24 is off or substantially off when the shutter is closed and specifically when one of the blades 18 is in the path of the light from the lamp 24 through the lens 12.

The coordination of the switch means or the transistor T1 and the position of the shutter 16 can be accomplished in several ways. As shown in FIG. 1, a commutator arrangement can be employed to achieve this purpose. A cylinder 38 is mounted on and rotates with the shaft 20. A pair of arcuate plates 40 on the surface of the cylinder 38 are electrically connected through conductors 42 with the shaft 20 which also is of a conductive material. Contact means in the form of a brush or spring 44 rides against the cylinder 38 and the plates 40 while other contact means in the form of a brush or spring 46 is in electrical contact with the shaft 20. A circuit is completed between the contacts whenever the contact 44 is in engagement with one of the plates 40. When this occurs, a circuit is completed through an additional power source or battery B in this instance and causes the transistor T1 to be in a highly conducting state and thereby effectively shunt the resistor 36. Thus, predetermined full power is supplied to the lamp 24 to provide a bright source of light for projecting the film 14. The plates 40 are positioned relative to the blades 18 in a manner such that the maximum power is supplied to the lamp 24 and the maximum amount of light is produced thereby when the blades 18 are out of the path of the light through the lens 12. When the contact 44 is not in engagement with one of the plates 40, the circuit is broken and the switch means or transistor T1 is in a state of low conductivity, whereby most of the current must pass through the resistor 36 and, hence, the lamp 24 will be substantially off.

While the exact time in which the lamp 24 will be on or receiving full power will vary somewhat according to the projector, full power will be supplied to the lamp for only approximately one-half the time, which results in a substantial reduction in the overall power requirement for the projector. The pulsed power also enables the lamp to have a longer life, operating at lower temperature, or enables it to operate for the short, pulsed periods under higher power than is possible when continuous power is supplied. Hence, the light from the lamp for brief periods can be brighter, which enables a xenon lamp to have a candle power rating similar to that of a carbon arc lamp in many instances. The xenon lamp thus can be used in instances where it would not otherwise be possible and thus enables an un-manned booth to be achieved by eliminating the necessity of employing carbon arc lamps.

A slightly modified embodiment of the invention is shown in FIG. 2, differing from that of FIG. 1 only in the manner in which the transistor T1 is coordinated with the movement of the shutter blades 18. Here, a pair of magnets 48 are mounted on arms 50 attached to the shaft 20 and rotatable therewith. A magnetically-sensitive reed switch 52 is located near the circular path of the magnets 48 and is closed when one of the magnets 48 comes into proximity with the switch. When the reed switch 52 is closed, it causes the transistor T1 to be in the highly conducting state in the same maner as when the corresponding circuit in FIG. 1 is closed. In a prefered form, the magnets 48 as well as the conducting plates 40 are mounted so as to be pivotally adjustable on the shaft 20 to enable the proper timing of the shutter and the peak of the lamp light to be achieved.

Various modifications of the above described embodiments of the invention will be apparent to those skilled in the art and it is to be understood that such modifications can be made without departing from the scope of the invention, if they are within the spirit and the tenor of the accompanying claims.

I claim:

1. In apparatus for projecting a film on a screen comprising a light source, a shutter positioned generally between the light source and the screen, means for moving said shutter to position it in the path of the light directed toward the screen and out of the path of the light directed toward the screen, and a source of power for said light source, the improvement comprising control means associated with said power source for alternately supplying maximum power to said light source from power source and lesser power to said light source from power source, said control means including power-restricting means connected in circuit between said power source and said light source and electrically-responsive switch means associated with said power-restricting means for selectively connecting said power-restricting means substantially into and out of the circuit, and means responsive to the position of said shutter for operating said electrically-responsive switch means to supply the maximum power to said light source from said power source when the shutter is in the position out of the path of light and to supply the lesser power through said power-restricting means to said light source from said power source when the shutter is in the path of the light.

2. The combination according to claim 1 characterized further by said drive means for said shutter includes rotating shaft means, and means responsive to the position of said shaft means for opening and closing said electrically-responsive switch means.

3. The combination according to claim 2 characterized by said position responsive means including a magnet rotatable with said shaft means, and a magnetically-responsive switch in circuit with said electrically-responsive switch means for operating said switch means when said magnet is in a predetermined position relative to said magnetically-operated switch.

4. The combination according to claim 2 characterized by said position responsive means including conductive means rotatable with said shaft means, and means including contact means engageable with said conductive means when in a predetermined position to complete a circuit and operate said electrically-responsive switch means.

5. In apparatus for projecting a film on a screen comprising a light source, a shutter positioned generally between the light source and the screen, means for moving said shutter to position it in the path of the light directed toward the screen and out of the path of the light directed toward the screen, and a source of power for said light source, the improvement comprising control means associated with said power source for alternately supplying maximum power to said light source from said power source and lesser power to said light source from said power source, said control means including impedance means connected in circuit between said power source and said light source, an electrically-responsive switch means connected in circuit between said power source and said light source around said impedance means for selectively connecting said impedance means into and out of the circuit, and means responsive to the position of said shutter for operating said electrically-responsive switch means to render said switch means conductive and to supply maximum power to said light source around said impedance means when the shutter is in the position out of the path of light and to render said electrically-responsive switch means substantially non-conducting to supply power through said impedance means to said light source to supply the lesser power to said light source when the shutter is in the path of the light.

References Cited

UNITED STATES PATENTS

| | | | |
|---|---|---|---|
| 2,186,013 | 1/1940 | Edgerton | 352—200 |
| 2,539,228 | 1/1951 | Celestin | 352—200 |

FOREIGN PATENTS

| | | |
|---|---|---|
| 595,139 | 11/1944 | Great Britian. |

NORTON ANSHER, Primary Examiner

A. A. MATHEWS, Assistant Examiner

U.S. Cl. X.R.

352—167, 200